Jan. 31, 1961 J. H. REAVES 2,970,278
DIRECT-COUPLED AMPLIFIER CONSTRUCTION
Filed May 9, 1955 2 Sheets-Sheet 1
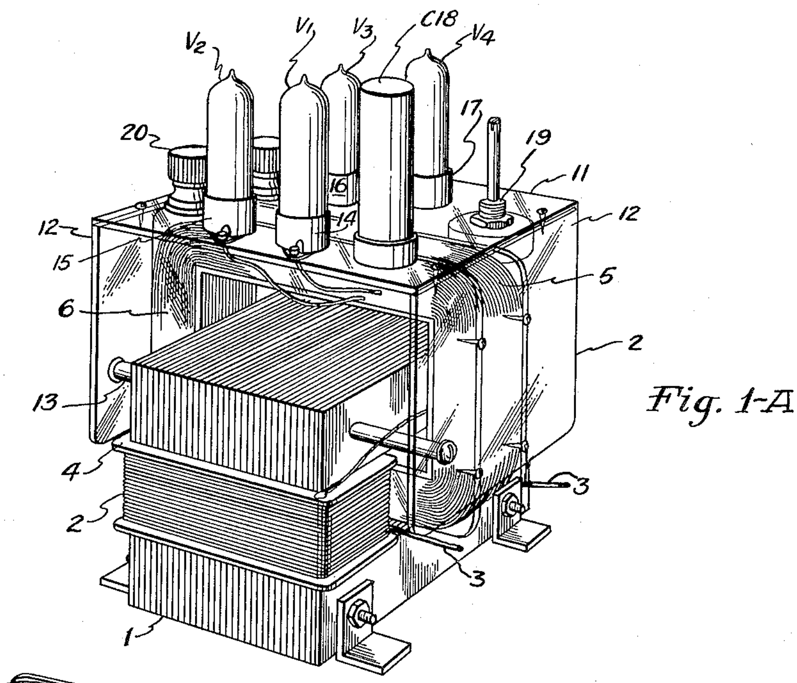
Fig. 1-A
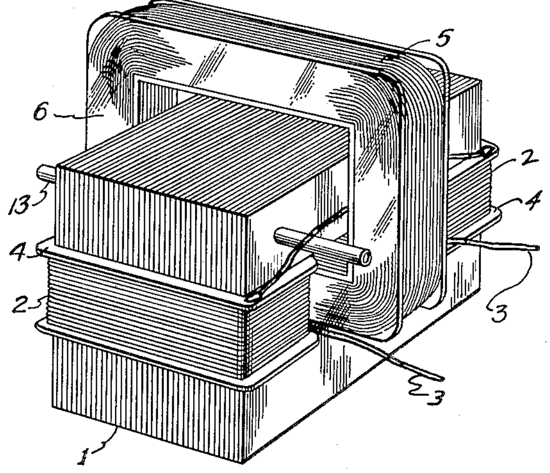
Fig. 1-B
INVENTOR
John H. Reaves
BY Arthur Vinograd ATTORNEY Jan. 31, 1961 J. H. REAVES 2,970,278
DIRECT-COUPLED AMPLIFIER CONSTRUCTION
Filed May 9, 1955 2 Sheets-Sheet 2
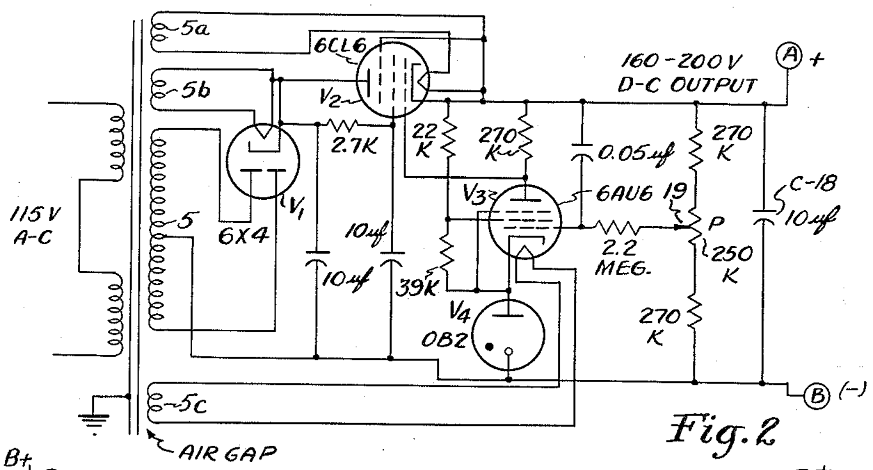
Fig. 2
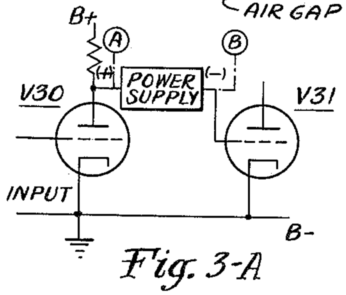
Fig. 3-A
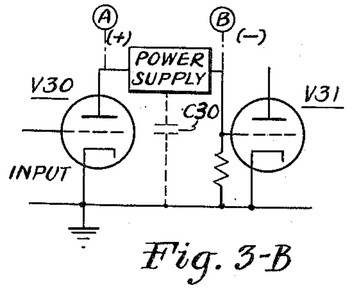
Fig. 3-B
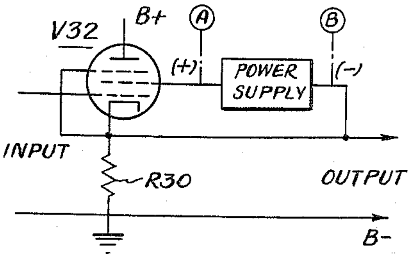
Fig. 3-C
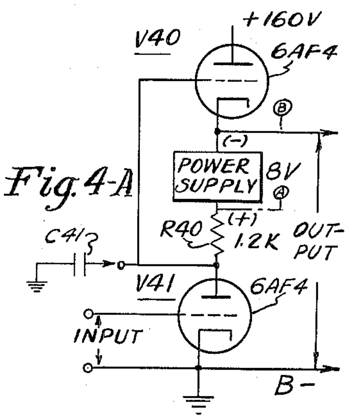
Fig. 4-A
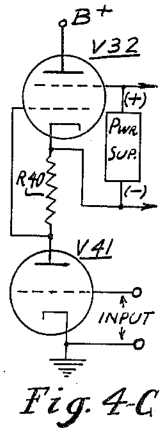
Fig. 4-C
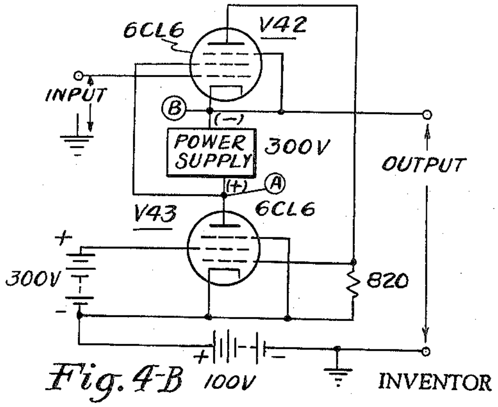
Fig. 4-B
INVENTOR
John H. Reaves
BY Arthur Vinograd ATTORNEY United States Patent Office 2,970,278

Patented Jan. 31, 1961

2,970,278

DIRECT-COUPLED AMPLIFIER CONSTRUCTION

John H. Reaves, McLean, Va., assignor to the United States of America as represented by the Secretary of Commerce Filed May 9, 1955, Ser. No. 507,186

6 Claims. (Cl. 330—70)

This invention relates to electronic amplifiers and particularly contemplates an improved power supply for direct-coupled amplifier circuits.

Some direct-coupled amplifier circuits require the use of a direct-current power source which can neither be grounded nor bypassed to ground if proper operation of the circuit is to be obtained. In such instances a conventional power supply cannot be used because of the large inherent shunting capacity of a conventional type of power transformer. Although batteries would be suitable in such application they suffer the disadvantages of short life, and unadjustability of voltages.

Conventional power transformers such as are employed in typical power supplies are designed for maximum power transfer efficiency, and because of the required close proximity between the windings and core in order to secure maximum coupling, such construction results in characteristically high capacitance between the windings and between the windings and core. When it is attempted to employ a conventional power supply in a circuit in which the power supply cannot be grounded or bypassed to ground, the effect of the capacitance is to shunt signals to ground. Moreover, even should a conventional power supply be employed in connection with such described type of circuit, signal losses would occur for all but the lowest frequencies. The present invention overcomes such limitations through the use of a power supply circuit which employs a specially constructed power transformer in which the secondary capacitance has been reduced to an extremely low value. Because of such feature it becomes possible to construct various embodiments of a novel direct-coupled amplifier employing the power supply according to this invention.

A low capacity transformer construction for filament supply use is disclosed in U.S. Patent No. 2,314,083 by J. L. Finch, but so far as is known no attempt has heretofore been made to employ a low-capacitance power supply for plate and bias voltage supply.

It is therefore an immediate object of this invention to provide a power supply, particularly adaptable to direct-coupled amplifier construction, which possesses a low shunt capacity and can therefore be used in circuits requiring the power supply to operate at a (signal) varying potential level with respect to ground.

A further object of this invention is to provide a power supply employing a special transformer construction in which the secondary windings are capacitively separated from the core and from the primary winding.

It is an additional object of this invention to provide a power supply which is particularly adaptable for use in direct-coupled circuit applications where neither terminal of the power supply can be grounded, or bypassed to ground.

A still further object of this invention is to provide a power supply in which the rectifying and filtering components can be physically mounted remote from those circuit elements which are at ground potential, and in proximity to the secondary winding of the transformer so that the shunt capacitance of the entire secondary circuit is kept at a minimum value.

An additional object of this invention is to provide various embodiments of direct-coupled amplifier circuits in which the voltage requirements are obtainable from a simple unitary type of A.-C. operated power supply.

Other uses and advantages of the invention will be apparent upon reference to the specification and drawings in which:

Fig. 1A is an isometric view showing a structural embodiment of the present invention;

Fig. 1B is an isometric view showing the transformer construction in greater detail;

Fig. 2 is a circuit diagram of an electronically regulated power supply circuit used in connection with the present invention;

Figs. 3A through 3C show various circuit modifications employing the power supply according to the present invention for interstage coupling and as a pentode-cathode follower circuit having good high frequency response;

Fig. 4A shows the present invention applied to a voltage amplifier circuit suitable for driving a capacitive load;

Fig. 4B shows a two-tube cathode follower circuit employing the features of the present invention suitable for driving a capacitive load, and Fig. 4C shows a modification of Fig. 4A employing a pentode.

The above objects are achieved according to the teachings of the present invention by employing a specially constructed power transformer in which the secondary winding is capacitively separated from the core, leaving as much air gap as the geometry of the construction permits. The effect of such preferred construction is to lower the capacitance of the secondary winding of the transformer in respect to the core and primary windings, respectively. Since the secondary winding forms an element of the signal circuits in the particular amplifier application in which the power supply is used, any shunt capacity effect is accordingly minimized. The construction of this invention also contemplates the mounting of the rectifying and filtering components of the transformer secondary circuit relatively far from objects which are at ground potential. These components are further mounted in a novel fashion adjacent to the transformer on an insulated chassis which, for all practical purposes, is an integral part of the form which contains the secondary winding. Such construction results in a very low value to the stray or shunting capacitance of the entire secondary circuit.

Fig. 1A shows a practical embodiment of a power supply employing the features of this invention. As shown in Fig. 1A the power supply includes a power transformer having a laminated core 1 of a size and configuration commensurate with the voltage and power requirements. The primary winding consists of a coil 2 having two sections each mounted on one leg of the transformer as shown in Fig. 1B. Only one section is shown in Fig. 1A. The coils are series connected and have external leads 3—3 adapted to be connected to a suitable 60-cycle A.-C. source. As indicated, the primary windings are each mounted on a respective spool 4 which is made of a suitable insulator such as Plexiglas, Lucite, etc., and are mounted on each leg of the core.

In order to reduce the capacitance effect of the secondary circuit of the power supply to a minimum, the secondary winding 5 is physically mounted on a large spool 6, which, as shown, has a re-entrant portion which passes through the throat of the transformer core. The spool for the secondary winding is also made of an insulating material, such as Plexiglas, and is arranged relative to the transformer core as indicated in Fig. 1, so that the secondary winding 5 is separated from the core as well as from the primary windings by the maximum amount of air gap which the geometry of the construction permits. As is apparent from Figs. 1A and 1B, only the re-entrant portion of the spool need be in proximity to the core and primary winding in order to obtain magnetic coupling between the windings necessary for transformer action. It follows that any capacitive effects between the secondary and primary winding is substantially limited to the region involving the re-entrant portion of the secondary.

The physical characteristics of the various components employed in a typical power transformer construction according to the present invention may be tabulated as follows:

| | |
|---|---|
| Transformer core dimension (inches)— | |
| Cross-section | ¾ x 1⅞ inches. |
| Outside dimension | 3 x 3 x 1⅞ inches. |
| Primary windings— | |
| Number of turns | 2 coils, 500 turns each. |
| Wire size | No. 28. |
| Spool dimensions— | |
| Cross-section | 1³⁄₁₆ x 1¹⁵⁄₁₆ inches. |
| Length | 1⁷⁄₁₆ inches. |
| Secondary windings— | |
| Number of turns | 5200 center-tapped. |
| Wire size | No. 34. |
| Spool dimensions— | |
| Cross-section | 2¾ x 1⅝ inches. |
| Length | ¾ inch. |

The core of the transformer is constructed of transformer steel, the lamination thickness being approximately 0.017 inch a value suitable for 60-cycle operation and which value may be decreased for higher frequencies of operation. Enameled wire is preferred for all windings because of its compactness, and the primary consists of two aiding series-connected coils mounted on opposite legs of the square periphery core 1. Such construction reduces magnetic leakage while permitting a maximum amount of clearance for the secondary winding. A transformer construction in accordance with the above specifications is capable of delivering approximately 30 milliamperes at 160 volts while manifesting only 18 micromicrofarads capacitance to ground. It is to be noted that the shunt capacitance of a conventional comparable power supply generally is approximately 700 micromicrofarads.

The above-featured power transformer construction further permits the mounting of the rectifying, filtering, and voltage regulating elements of the power supply in a novel manner, a construction which results in a very low value to the stray or shunting capacitance of the entire secondary circuit.

The physical arrangement of the rectifying, filtering, and voltage regulating components of a typical power supply according to this invention is shown in Fig. 1A. As indicated, all of such elements are mounted on an insulated platform comprising a mounting panel 11 provided with a pair of transverse mounting flanges 12—12. The material of the panel and flanges may be any convenient insulator, such as Plexiglas, Lucite, etc. The power transformer described includes a plurality of mounting studs 13 to which flanges are secured. All of the electronic components comprising the rectifying, filtering and voltage regulating elements are compactly mounted on the panel 11 as indicated.

Fig. 2 shows the complete circuit diagram for the power supply, the physical embodiment of which is illustrated in Fig. 1. The various components mounted on the panel as illustrated in Fig. 1 may readily be identified, and their circuit relationship established in connection with the diagram of Fig. 2.

Specifically, as the circuit diagram indicates, a rectifier V–1 of the 6X4 variety, for example, is mounted in a suitable socket 14 secured directly to the panel 11. The tubes V–2, V–3, and V–4, which are of the type indicated in Fig. 2, comprise the voltage-regulator circuit of the power supply and are mounted in suitable sockets 15, 16, and 17 in convenient relationship to the rectifier tube on the panel 11. The three-section filter condenser C–18 and the voltage control potentiometer 19 are also secured to the mounting panel 11.

Returning to the description of the power transformer, it will be noted from Fig. 2 that the secondary winding 5 is designed to provide a plurality of output voltages. The three heater windings 5*a*, 5*b*, and 5*c* in the transfomer may be mounted on top or underneath the high voltage secondary winding. The remainder of the circuit elements comprising the power supply are arranged on the lower surface of the mounting panel 11 in accordance with the wiring diagram of Fig. 2. Suitable output terminals 20 are provided on the mounting panel 11.

The electrical configuration of the typical regulated power supply circuit employed in the present invention is conventional except that it is ungrounded and will therefore not be described in detail. A general description of an equivalent grounded supply is given on pages 378–379 of "Electronics Experimental Techniques" by Elmore and Sands.

The isolation of the secondary winding causes the efficiency of the transformer to be lowered somewhat, partly because of the decrease in the resulting magnetic coupling, and partly because of the increased circumference of the windings. Although for the low-power applications contemplated in the subsequent description, poor power efficiency is not in itself serious, the accompanying increase in percentage voltage drop under load (regulation) is important. However, by employing electronic stabilization in the power supply circuit, as shown in Fig. 2, good regulation of the D.C. output voltage can be achieved in spite of the relatively poor regulation of the transformer.

The power supply constructed according to the specification described provides full wave rectification and with the following regulation characteristics:

| No Load Voltage | Maximum Load Voltage |
|---|---|
| 160 | 156 at 30 ma. |
| 200 | 199 at 20 ma. |

| | |
|---|---|
| Shunt capacitance | 18$\mu\mu$f. |
| Figure of merit (see below) | 260 |

The above-indicated shunt capacity value was measured with the power supply resting in an upright position on a grounded metal plate, the primary winding being grounded. The capacitance of the power supply constructed in accordance with the described specifications, measured only 18 $\mu\mu$f (mmfd.) as indicated. By comparison, the shunt capacitance of a typical conventional supply for the same power measured approximately 700 $\mu\mu$f. Much of this difference is attributable to the special transformer construction described.

In order to determine the relative merits of the power supplies constructed in accordance with the teachings of this invention, a suitable figure of merit was assumed to be the ratio of the maximum power output in milliwatts to the total shunt capacitance in $\mu\mu$f.

Several power supplies employing the special low-capacitance type of construction described were constructed for various current and voltage outputs as is indicated in Figs. 4A and 4B which show various exemplary voltage requirements.

The usefulness of the low-capacitance type of power supply can be demonstrated by several examples of novel circuits which can be constructed in connection with such type of power supply.

A novel direct-coupled amplifier construction employing the power supply of the present invention is shown in Figs. 3A and 3B, the power supply being used in two different ways to provide direct interstage coupling. The output terminals A and B of the power supply circuit shown in Fig. 2 are similarly identified in the various embodiments illustrated in Figs. 3A–3C and 4A–4C.

Referring to Fig. 3A, the power supply employed is ungrounded and has a very low secondary capacitance, therefore, signal attenuation due to the referred to shunt capacity effects is extremely small even for very high signal frequencies. In the particular embodiment of the invention shown in Fig. 3A, the power supply is not required to supply any current.

The modification of Fig. 3B shows the power supply providing the plate current for stage V–30 while serving as the coupling means between stages. In this modification, the magnitude of the plate voltage is not critical especially if a pentode-type tube is used for the amplifier V–30 in which case the screen would be held at a constant potential with respect to cathode and ground. In Fig. 3B there is also symbolically illustrated in dotted lines the capacitive shunting effect (C–30) imposed on the circuit when a conventional power supply is used.

The advantages of an amplifier construction embodying the principles of the present invention can best be appreciated by comparison with a conventional direct-coupled amplifier such as is described on pages 529–531 (see Fig. 12.44) of the "Radiotron Designer's Handbook." While, in such type of construction, the shunt-capacity effects of the power supply is not important because it is already grounded, there exists the disadvantages of (1) signal attenuation by the voltage divider action across the resistors R–2 and R–3, and (2) the voltage divider circuit has to be capacitively compensated by the inclusion of a capacitor across the resistor R–2 in order to compensate for the shunting effect occasioned by the tubes' input across the resistor R–3. In conventional direct-coupled amplifier circuits such as is represented in the referred to text such compensation is critical and sometimes unsatisfactory due to variations in the input impedance to the tube. Moreover, as compared to a conventional direct-coupled amplifier circuit construction, such as described in Fig. 12.44 of the referred to Handbook, the circuit shown in Fig. 3B is relatively insensitive to variations in the value of the supply voltage.

The power supply is shown in Fig. 3C as being employed to provide screen-grid potential in a pentode-cathode follower circuit. As shown, terminal A of the described power supply is connected to the screen grid of a pentode V–32 while terminal B is connected to the tube cathode. The output is obtained across resistor R–30.

Two direct-coupled circuits in which the novel power supply has been found to be particularly useful are illustrated in Figs. 4A and 4B. The two-tube amplifier illustrated in Fig. 4A employs a pair of tubes V–40, V–41 of the 6AF4 type. Terminal B of the power supply is shown connected to the cathode of tube V–40 while terminal A is connected through a resistor R–40 to the plate of tube V–41. The input signal is applied across the grid of tube V–41 and the output is obtained across the cathodes of tubes V–40 and V–41 respectively as indicated.

A two-tube cathode follower circuit employing the power supply according to the present invention is shown in Fig. 4B. In this circuit the tubes V–42, V–43 may be of the 6CL6 type and the power supply is connected as indicated to the plate of V–43 and to the cathode of V–42, respectively. The input signal is applied to the grid of V–42 and the output is obtained across the circuit including the power supply and tube V–43 in series.

With a load that is predominantly capacitive and a signal that has a high duty factor, either of the circuits shown in Figs. 4A and 4B gives better high-frequency response for a given average plate current than a conventional single-tube amplifier or cathode follower. While circuits of this general type, employing two series-connected tubes driven in opposite phase, are described in U.S. Patent No. 2,358,428 issued to E. L. C. White and by P. G. Sulzer in an article entitled, "Survey of Audio Frequency Power-Amplifier Circuits" appearing in "Audio Engineering," vol. 35, No. 5, May 1951, the particular two-tube direct-coupled circuits described in connection with Fig. 4A and 4B are believed to be novel because of the singular relationship between the circuit and the power supply employed.

The amplifier circuit of Fig. 4A has, in addition to low output impedance, good linearity and a voltage gain very nearly equal to the amplification factor of stage V–41. An improved version of this circuit is obtained by using a pentode in place of a triode for the tube V–40 as shown in Fig. 4C. In such case, the power supply is not needed in the position shown in Fig. 4A but instead is connected as in Fig. 3C so as to supply the screen-grid potential in the manner illustrated in Fig. 4C. The amplifying circuit of Fig. 4A can be modified by adding a capacitor 41 from the plate of V–41 to ground thus making a novel linear sawtooth generator of the familiar bootstrap type.

The two-tube cathode follower circuit of Fig. 4B has higher input impedance, better linearity, nearer unity gain, and lower output impedance than a conventional single tube cathode follower. As an example of its high efficiency when driving a capacitive load, this circuit with the component values shown, will supply peak charge and discharge current of 80 ma. with an average plate circuit current as low as 15 ma. A conventional single-tube circuit giving comparable square-wave output with the same load capacitance requires an average plate current of approximately 100 ma.

The above exemplary embodiments typify instances in which direct-coupled circuits must be supplied with a D.C. source which cannot be grounded or bypassed to ground. By combining the novel low-capacitance power supply with such direct-coupled circuits in accordance with the teachings of this invention it becomes possible to construct such circuits for convenient A.C. operation and thereby eliminate the need for batteries.

While a preferred embodiment of the invention has been disclosed and described in the accompanying drawings, it will be apparent that various modifications and embodiments of the singular features of the invention described would readily follow from the present disclosure. For example, in the construction of the power transformer, the primary windings could be capacitively isolated and separated from the secondary, while to further reduce the capacitive effects both the primary and secondary of the transformer could be physically separated with respect to the core. It is therefore not intended to restrict the present invention to any specific construction except as defined in the appended claims.

What is claimed is:

1. A direct-coupled amplifier comprising: a power source including a transformer having an open throat core of magnetic material, a primary positioned on said core and a secondary having a portion extending through the open throat of said core, said secondary being spaced from said primary and from said core, the spacing between said core, primary and secondary being the maximum permitted by the geometry of the core, primary and secondary, an alternating current source connected across said primary, converting means directly connected to said secondary for converting the alternating current in said secondary into a direct current potential, means for maintaining said direct current potential at a substantially constant level, said last-mentioned means interposed between a first and second terminal and said converting means, means for applying said direct current potential to said first and second terminal as a positive and negative potential, respectively, a pair of electron tubes, each having at least an accelerating electrode, control grid and cathode, means for applying only the positive potential appearing at said first terminal to at least one accelerating electrode of at least one of said electron tubes, and means for applying the negative potential appearing at said second terminal to at least one of said electron tubes as a source of bias.

2. A direct-coupled amplifier comprising: a power source including a transformer having an open throat core of magnetic material, a primary positioned on said core, and a secondary having a portion extending through the open throat of said core, said secondary being spaced from said primary and from said core, the spacing between said core, primary and secondary being the maximum permitted by the geometry of the core, primary and secondary, an alternating current source connected across said primary, converting means directly connected to said secondary for converting the alternating current in said secondary into direct current potential, means for mounting said converting means in close proximity to said secondary and remote from said primary and said core, a first and second terminal, means for applying said direct current potential to said first and second terminal as a positive and negative potential, respectively, means interposed between said converting means and said first and second terminal for maintaining said direct current potential at a substantially constant level, a pair of electron tubes, each having at least an accelerating electrode, control grid and cathode, means for applying only the positive potential appearing at said first terminal to at least one accelerating electrode of one of said electron tubes, an impedance element connected between said second terminal and ground, and means for applying the potential developed across said impedance element as a source of bias to the other of said electron tubes.

3. A direct-coupled amplifier comprising: a power source including a transformer having an open throat core of magnetic material, a primary positioned on said core and a secondary having a portion extending through the open throat of said core, the spacing between said core, primary and secondary being the maximum permitted by the geometry of the core, primary and secondary, an alternating current source connected across said primary, converting means directly connected to said secondary for converting the alternating current in said secondary into direct current potential, means for mounting said converting means in close proximity to said secondary and remote from said primary and said core, a first and second terminal, means for applying said direct current potential to said first and second terminal as a positive and negative potential, respectively, means interposed between said converting means and said first and second terminal for maintaining said direct current potential at a substantially constant level, an electron tube having at least an anode, cathode, control grid and screen grid, means for applying only the positive potential appearing at said first terminal to said screen grid, means connecting said second terminal to the cathode of said electron tube, an impedance element connected between said cathode and ground, and an output circuit connected across said impedance element.

4. A direct-coupled amplifier comprising: a power source including a transformer having an open throat core of magnetic material, a primary positioned on said core, and a secondary having a portion extending through the open throat of said core, said secondary being spaced from said primary and from said core, the spacing between said core, primary and secondary being the maximum permitted by the geometry of the core, primary and secondary, an alternating current source connected across said primary, converting means directly connected to said secondary for converting the alternating current in said secondary into direct current potential, means for mounting said converting means in close proximity to said secondary and remote from said primary and said core, a first and second terminal, means for applying said direct current potential to said first and second terminal as a positive and negative potential, respectively, means interposed between said converting means and said first and second terminal for maintaining said direct current potential at a substantially constant level, a first and second electron tube, each having at least an anode, cathode and control grid, means for applying only the positive potential appearing at said first terminal to the anode of said first electron tube, means connecting said second terminal to the cathode of said second electron tube, and means for connecting the anode of said first electron tube to the control grid of said second electron tube.

5. A direct-coupled amplifier comprising: a power source including a transformer having an open throat core of magnetic material, a primary positioned on said core and a secondary having a portion extending through the open throat of said core, the spacing between said core, primary and secondary being the maximum permitted by the geometry of the core, primary and secondary, an alternating current source connected across said primary, converting means directly connected to said secondary for converting the alternating current in said secondary into direct current potential, means for mounting said converting means in close proximity to said secondary and remote from said primary and said core, a first and second terminal, means for applying said direct current potential to said first and second terminal as a positive and negative potential, means for mounting said converting means in close proximity to said secondary and remote from said primary and said core, a first and second terminal, means for applying said direct current potential to said first and second terminal as a positive and negative potential, respectively, means interposed between said converting means and said first and second terminal for maintaining said direct current potential at a substantially constant level, a first and second electron tube, each including at least an anode, screen grid, control grid and cathode, means for applying only the positive potential appearing at said first terminal to the anode of said first electron tube and to the screen grid of said second electron tube, and means for connecting the cathode of said second electron tube to said second terminal.

6. A direct-coupled amplifier comprising: a power source including a transformer having an opened throat core of magnetic material, a primary positioned on said core and a secondary having a portion extending through the open throat of said core, the spacing between said core, primary and secondary being the maximum permitted by the geometry of the core, primary and secondary, an alternating current source connected across said primary converting means directly connected to said secondary for converting the alternating current in said secondary into direct current potential, means for mounting said converting means in close proximity to said secondary and remote from said primary and said core, a first and second terminal, means for applying said direct current potential to said first and second terminal as a positive and negative potential, respectively, means interposed between said converting means and said first and second terminal for maintaining said direct current potention at a substantially constant level, a first electron tube having at least an anode, screen grid, control grid and cathode, means for applying only the positive potential appearing at said first terminal to the screen grid of the first electron tube, means for connecting said second terminal to the cathode of said first electron tube, a second electron tube having at least an anode, cathode, and control grid, means for connecting the cathode and control grid of said first electron tube to the plate of said second electron tube.

(References on following page)

References Cited in the file of this patent

UNITED STATES PATENTS

| | | |
|---|---|---|
| 1,112,655 | Pierce | Oct. 6, 1914 |
| 1,561,204 | Beers | Nov. 10, 1925 |
| 1,789,664 | White | Jan. 20, 1931 |
| 1,896,480 | Christopher | Feb. 7, 1933 |
| 2,032,193 | White | Feb. 25, 1936 |
| 2,310,342 | Artzt | Feb. 9, 1943 |
| 2,314,083 | Finch | Mar. 16, 1943 |
| 2,324,797 | Norton | July 20, 1943 |
| 2,354,718 | Tuttle | Aug. 1, 1944 |
| 2,358,428 | White | Sept. 19, 1944 |
| 2,431,335 | Langmuir | Nov. 25, 1947 |
| 2,525,632 | Anderson | Oct. 10, 1950 |
| 2,549,833 | Martinez | Apr. 24, 1951 |
| 2,554,469 | Minzer | May 22, 1951 |
| 2,593,066 | Singer | Apr. 15, 1952 |
| 2,594,530 | Young | Apr. 29, 1952 |
| 2,594,572 | Lupo | Apr. 29, 1952 |
| 2,609,527 | Raburn et al. | Sept. 2, 1952 |
| 2,682,635 | Henrich | June 24, 1954 |

FOREIGN PATENTS

| | | |
|---|---|---|
| 412,182 | Great Britain | June 19, 1934 |

OTHER REFERENCES

Text: Theory and Applications of Electron Tubes, by Reich, 2nd edition, 1944, page 588.